(12) United States Patent  (10) Patent No.: US 9,043,778 B2
Lin et al.                    (45) Date of Patent:   May 26, 2015

(54) METHOD AND SYSTEM FOR UPGRADING SOFTWARE

(71) Applicant: Tencent Technology (Shenzhen) Company Limited, Shenzhen (CN)

(72) Inventors: Yehui Lin, Shenzhen (CN); Zurong Wu, Shenzhen (CN); Qing Chang, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/354,405

(22) PCT Filed: Nov. 16, 2012

(86) PCT No.: PCT/CN2012/084721
§ 371 (c)(1),
(2) Date: Apr. 25, 2014

(87) PCT Pub. No.: WO2013/078951
PCT Pub. Date: Jun. 6, 2013

(65) Prior Publication Data
US 2014/0304697 A1   Oct. 9, 2014

(30) Foreign Application Priority Data
Dec. 1, 2011   (CN) .......................... 2011 1 0392461

(51) Int. Cl.
*G06F 9/44*   (2006.01)
*G06F 9/445*  (2006.01)

(52) U.S. Cl.
CPC .. *G06F 8/65* (2013.01); *G06F 8/68* (2013.01); *G06F 8/71* (2013.01)

(58) Field of Classification Search
CPC ............... G06F 8/68; G06F 8/34; G06F 8/65; G06F 8/71
See application file for complete search history.

(56) References Cited

U.S. PATENT DOCUMENTS 7,461,373 B2 * 12/2008 Herle et al. .................... 717/171
7,861,224 B2 * 12/2010 Petrov et al. ................... 717/122
(Continued)

FOREIGN PATENT DOCUMENTS

| CN | 101026464 A | 8/2007 |
| CN | 101442688 A | 5/2009 |
| CN | 102081536 A | 6/2011 |

OTHER PUBLICATIONS

Clarke et al., Abstract delta modeling, Oct. 2010, 10 pages.*
(Continued)

*Primary Examiner* — Thuy Dao
(74) *Attorney, Agent, or Firm* — Cantor Colburn LLP

(57) ABSTRACT

Embodiments of the present disclosure provide a method and a system for upgrading software. The method includes: a client reports a software upgrade request to a server, wherein the upgrade request carries file information of the local software to be upgraded; the server determines the difference with the latest version software according to the file information of the software to be upgraded in the upgrade request, and generates upgrade instruction information according to the difference and sends it to the client; the client downloads and updates the relevant files and performs the relevant local upgrade operations according to the instructions in received upgrade instruction information. Technical solutions of the present disclosure can save bandwidth resources and reduce the workload for upgrading software.

13 Claims, 4 Drawing Sheets

(56) References Cited

U.S. PATENT DOCUMENTS

| | | | |
|---|---|---|---|
| 7,958,502 B2* | 6/2011 | Motta et al. | 717/168 |
| 8,166,449 B2* | 4/2012 | Jazdzewski | 717/100 |
| 8,296,535 B2* | 10/2012 | Eker et al. | 711/162 |
| 8,341,132 B2* | 12/2012 | DeFrang | 707/695 |
| 8,924,950 B2* | 12/2014 | McDonald et al. | 717/170 |
| 2003/0163801 A1* | 8/2003 | Thames et al. | 717/123 |
| 2009/0217256 A1* | 8/2009 | Kim | 717/168 |
| 2011/0067019 A1* | 3/2011 | Petrov et al. | 717/170 |
| 2011/0113414 A1* | 5/2011 | Ewington et al. | 717/168 |
| 2012/0290596 A1* | 11/2012 | Ingles | 707/758 |
| 2014/0173588 A1* | 6/2014 | Ko | 717/173 |

OTHER PUBLICATIONS

M. Helvensteijn, Dynamic delta modeling, Sep. 2012, 8 pages.*

Hayase et al., Revision control system using delta script of syntax tree, Sep. 2015, 17 pages.*

International Search Report issued Feb. 7, 2013 re: PCT/CN2012/084721; citing: CN 102081536 A, CN 101026464 A and CN 101442688 A.

* cited by examiner

METHOD AND SYSTEM FOR UPGRADING SOFTWARE

The application is continuation of International Application No. PCT/CN2012/084721, filed on Nov. 16, 2012, which claims the priority of Chinese patent application No. 201110392461.4, filed on Dec. 1, 2011, in Chinese Patent Office, entitled "method and system for upgrading software", the disclosure of which is incorporated herein by reference in its entirety.

FIELD OF THE DISCLOSURE

The present disclosure relates to software processing technology field of data processing devices, and more particularly, to a method and system for updating software.

BACKGROUND OF THE DISCLOSURE

There are at present two methods for upgrading software of data processing devices (like computers, intelligent mobile phones and so on), one is an upgrading method based on installation package, the other is an upgrading method based on cab upgrading package.

The upgrading method based on installation package is very simple. It is necessary to download a latest installation package from a server, and run the installation package after the installation package is downloaded. The installation package will achieve the uninstallation of the old version and the installation of the new version.

Disadvantage of the upgrading method based on installation package is as follows. Bandwidth is greatly wasted. A user has to download an installation package as big as several Mega (M) bytes or even hundreds of M bytes even if a small change is made on the function, and most unchanged files will be downloaded and replaced together, thus bandwidth is greatly wasted.

The upgrading method based on cab upgrading package is more targeted. The cab upgrading package is a kind of Microsoft WINDOWS operating system package, which includes upgrading files. For the manner, difference files between software version x and version y are packaged in accordance with standard format (cab format) of the operating system to get a cab upgrading package. The upgrading program starts the cab upgrading package after the cab upgrading package is downloaded to local device of the user, and the cab upgrading package will finish the upgrade and operation of specified files according to internal upgrading logic and files, thus software version upgrading is implemented.

The upgrading manner based on cab upgrading package, however, has the following disadvantage. More and more software versions will lead to increasing workload of making cab upgrading packages. For example, if a current version of a product is m, while the minimum version supported in the operation environment is n, it means that there are m-n different versions are used by the user in current operation environment at the same time, so adopting the upgrading manner means that it is needed to make a cab upgrading package for each of the m-n different versions respectively, and that upgrading of every time is in the mode. Thus it is a huge amount of workload to make multiple versions of cab upgrading package, and software upgrading maintenance cost is greatly increased accordingly.

SUMMARY OF THE DISCLOSURE

In view of above, embodiments of the present disclosure provide a method for upgrading software and a system for upgrading software, so as to save bandwidth resource and reduce software upgrading workload.

The method for upgrading software provided by embodiments of the present disclosure includes:

reporting, by a client, a upgrading request of software to a server, and the upgrading request carrying file information of to-be-upgraded software in local;

determining, by the server, difference between the to-be-upgraded software and a latest version software according to the file information of the to-be-upgraded software in the upgrading request, and generating, by the server, upgrading instruction information according to the difference and sending the upgrading instruction information to the client;

downloading and updating, by the client, corresponding files and executing, by the client, a corresponding local upgrading operation according to an instruction in the upgrading instruction information;

wherein, the file information of the to-be-upgraded software carried in the upgrading request comprises: file name and version information of each of files of the to-be-upgraded software;

determining, by the server, difference between the to-be-upgraded software and the latest version software according to the file information of the to-be-upgraded software in the upgrading request comprises: comparing, by the server, the to-be-upgraded software with the latest version software according to file name and version information of each of files of the to-be-upgraded software, and determining, by the server, file difference and version difference;

generating, by the server, upgrading instruction information according to the difference comprises:

finding, by the server, a newly-added file and a modified file in the latest version software according to the file difference, and organizing, by the server, list information of the newly-added file and modified file into a to-be-updated file list;

finding, by the server, operation instruction sets of all software each of which the version is higher than the version of the to-be-upgraded software in the upgrading request according to the version difference, and combining, by the server, found operation instruction sets;

taking, by the server, the to-be-updated file list and combined operation instruction set as the upgrading instruction information.

The system for upgrading software provided by embodiments of the present disclosure includes:

an upgrading module set in a client, configured to report a software upgrading request carrying file information of a to-be-upgraded software to the server, download and update a corresponding file and executing a corresponding local upgrading operation according to an instruction in upgrading instruction information returned by a server; and an upgrading service module set in the server, configured to receive the upgrading request sent by the upgrading module in the client, and determine difference between the to-be-upgraded software and a latest version software according to file information of the to-be-upgraded software in the upgrading request, generate upgrading instruction information according to the difference and issues the upgrading instruction information to the upgrading module in the client;

wherein, the upgrading service module comprises:

a version difference determining module, to compare the to-be-upgraded software with the latest version software according to file name and version information of each file comprised in the to-be-upgraded software, and determine file difference and version difference;

a to-be-updated file determining module, to find a newly-added file and a modified file in the latest version software according to the file difference, and organize list information of the newly-added file and modified file to form a to-be-updated file list;

an operation instruction determining module, to find operation instruction sets of all software each of which the version is higher than version of the to-be-upgraded software in the upgrading request, and combine found operation instruction sets; and an upgrading instruction combining and sending module, to take the to-be-updated file list and combined operation instruction set as upgrading instruction information and send the upgrading instruction information to the upgrading module of the client.

Comparing with the prior art, in the present disclosure, the server determines difference between the to-be-upgraded software and the latest version software according to file information of the to-be-upgraded software, dynamically generates upgrading instruction information according to the software difference and issues the upgrading instruction information to an upgrading module of the client; the upgrading module finishes downloading, upgrading and deleting files and registering COM components and other operations according to the issued upgrading instruction. Thus there may be less interaction information between the server and the client, and bandwidth resource may be saved. In addition, the upgrading server may dynamically organize upgrading instructions according to version situation of a user, thus software upgrading workload may be reduced, and then operation cost for maintaining software upgrading system may be reduced.

DETAILED DESCRIPTION OF THE DISCLOSURE

In the present disclosure, the processing logic in a cab package is migrated to an upgrading module of a data processing device client, and a server determines difference between the to-be-upgraded software and the latest version software according to file information of the to-be-upgraded software, and generates upgrading instruction information according to the software difference and issues the upgrading instruction information to the upgrading module of the client; the upgrading module finishes downloading, upgrading and deleting files and registering COM components and other operations according to the issued upgrading instructions, while these operations have to be executed by the cab package in the prior art. Thus interaction information between the server and client is reduced, bandwidth resource is saved, and the work of manually making cab package is avoided, the upgrading server dynamically organizes upgrading instructions according the version situation of a user instead, and workload of software upgrading is reduced, and thus operation cost for maintaining software upgrading system is reduced.

The present disclosure will be described in detail hereinafter with reference to accompanying drawings.

Figure 1:
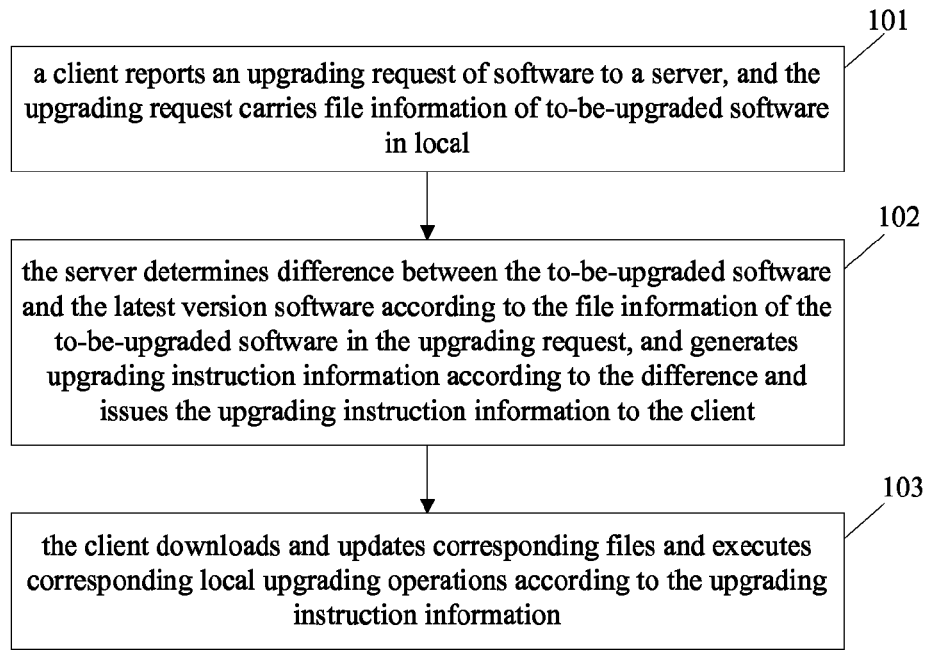
FIG. 1 is a flowchart illustrating a method for upgrading software according to an embodiment of the present disclosure.

FIG. 1 is a flowchart illustrating a method for upgrading software according to an embodiment of the present disclosure. As shown in FIG. 1, the method may include the following processes.

Block 101, a client reports an upgrading request of software to a server, and the upgrading request carries file information of to-be-upgraded software in local.

Block 102, the server determines difference between the to-be-upgraded software and the latest version software according to the file information of the to-be-upgraded software in the upgrading request, and generates upgrading instruction information according to the difference and issues the upgrading instruction information to the client.

Block 103, the client downloads and updates corresponding files and executes corresponding local upgrading operations according to the received upgrading instruction information.

The client may be software running in a computing system which has a Central Processing Unit (CPU), a memory and an operating system and provides software operating environment. A typical example of the computing system may be a desktop computer, a laptop computer, a panel computer or a handhold device like intelligent mobile phone with computing capability or a robot device with computing capability etc. Operations on the client side in the method provided by the present disclosure may be executed by an upgrading module corresponding to local to-be-upgraded software, and the upgrading module may be a software program, which may be run in a process independent of the to-be-upgraded software when being started.

File information in the upgrading request sent by the upgrading module in the client mainly includes file names and version information of files included in the to-be-upgraded software, and may further include information such as a HASH value and a relative path of each of files. After receiving the upgrading request, the server finds the latest version software according to a name of the to-be-upgraded software in the upgrading request, and compares the to-be-upgraded software with the latest version software according to various file names and version information, and determines file difference and version difference. It is unnecessary to upgrade the software when there is no difference, and the server returns an instruction of no needing to upgrade to the client, and after receiving the instruction, the upgrading module of the client stops the upgrading operation. When there is difference, the server dynamically generates upgrading instruction information according to the software version difference.

The method of the server dynamically generating upgrading instruction information according to the software version difference may include the following steps 11) to 13):

11) Find the newly-added files and modified files in the latest version software according to the file difference, and organize list information of the newly-added files and modified files into to-be-updated file list information.

The to-be-updated file list information includes a list of files to be newly-added, modified or replaced when upgrading the software from current version in the upgrading request to the latest version. Each file includes file description information, such as a file name, a relative path, a file size and a MD5 check value etc.

Here, the server may maintain a mapping table of the latest version of all files aiming at the to-be-upgraded software, and table 1 shows an example of the mapping table.

TABLE 1

| File name | Relative path | Size | Last modified version |
|---|---|---|---|
| AAA.dll | % INSTALL_DIR %/BIN | 2513 | 20532 |
| BBB.dll | % INSTALL_DIR %/BIN | 4732 | 20476 |
| CCC.png | % INSTALL_DIR %/RES | 1004 | 20587 |
| DDD.bmp | % INSTALL_DIR %/RES | 1313 | 20476 |

As shown in table 1, the mapping table includes list information of the latest version of all files of the to-be-upgraded software, and each piece of file list information at least includes a file name, download path information and relative path information. In the above table 1, since the server stores all files of the same software in a unified general directory corresponding to the software, and the relative paths under the directory is totally the same as the relative paths under an installation directory of the software in the client, the relative paths shown in table 1 can represents the download paths. It is only needed to add the general directory of the software located in the server to the front of the relative paths, so only relative paths are maintained in table 1, and download path information may be obtained by adding address of the general directory to the relative paths. Of course, table 1 may also include absolute download path information, and the client may download corresponding files from the absolute download path information without adding any directory address. In addition, the file list information in the mapping table further includes a file size, a MD5 check value (due to width limit, the MD5 check value is not shown in table 1) etc. and last modified version information.

After receiving the upgrading request, the server filters above-mentioned mapping table using a current file list of the to-be-upgraded software carried in the upgrading request, remains the newly-added files and modified files in the latest version software to organize a to-be-updated file list. The newly-added files are files the to-be-upgraded software in the client does not have; the modified files are files in the latest version software, of which file names are the same as that of files in the to-be-upgraded software in the client, but file version information is different from that of files in the to-be-upgraded software in the client, which means of which the contents are changed, and it is necessary to modify files, in the to-be-upgraded software in the client, with the same names as those in the latest version software.

12) Find operation instruction sets of all software each of which the version is higher than version information of the to-be-upgraded software in the upgrading request according to the version difference, and combine the found operation instruction sets.

In the present disclosure, updating of each software version may accompany with an operation instruction set, and several such operation instructions may be used for upgrading version once, and these operation instructions will be organized in the form of set finally. Each operation instruction in the operation instruction set may include: an operation instruction name which may be identified by the local client, and a relative path and a file name of a target file of the operation corresponding to the instruction, and may further include a name of an auxiliary program for processing the target file. Table 2 is an example of an operation instruction set. In order to facilitate illustration, table 2 further includes use instruction of each operation instruction.

TABLE 2

| Instruction name | Target file | Use instruction |
|---|---|---|
| regsvr32 | % INSTALL_DIR %/Ext/AuHelp.dll | Register a specified COM component |
| unregsvr32 | % INSTALL_DIR %/Ext/Help.dll | Deregister a specified COM component |
| delete | % INSTALL_DIR %/Util/Util.dll | Delete a specified file |
| execute | % INSTALL_DIR %/TEST.dll + auxiliary program name | Perform specified processing on a target file through a specified auxiliary program |

Figure 2:
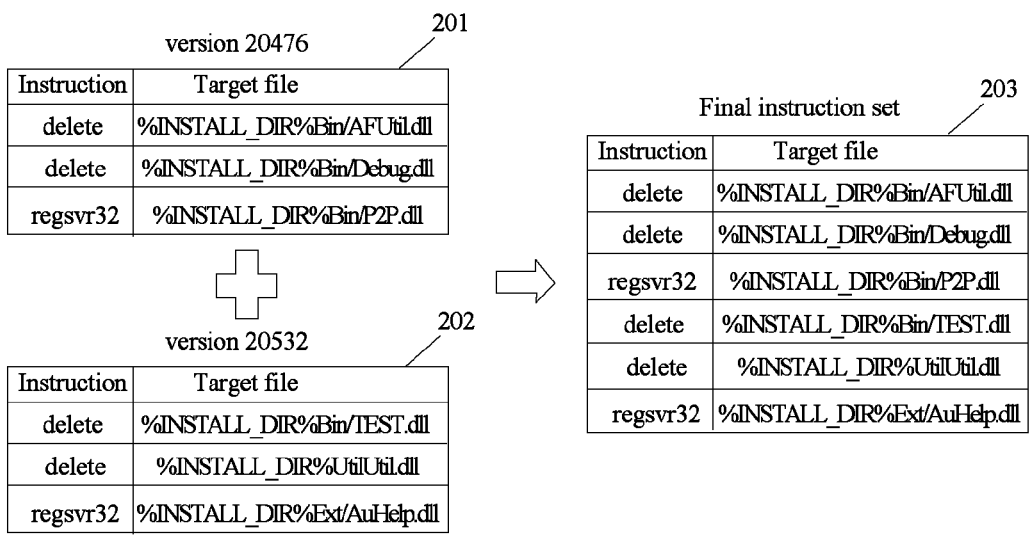
FIG. 2 is a flowchart illustrating the operation of combining the found operation instruction sets according to an embodiment of the present disclosure.

There may be one operation instruction set in the server regarding to upgrading of each software version, and each operation instruction set has a version. After receiving the upgrading request, the server finds operation instruction sets of all software each of which the version is higher than the version of the to-be-upgraded software in the upgrading request, and finally returns an operation instruction set, which is obtained by combining all found operation instruction sets, to an upgrading module. FIG. 2 is a diagram illustrating the operation of combining the found operation instruction sets in the present disclosure. As shown in FIG. 2, suppose operation instruction sets of higher versions than version in the upgrading request are operation instruction set 201 of version 20467 and operation instruction set 202 of version 20532, when the two operation instruction sets are combined, a final instruction set 203 is obtained.

13) Take the to-be-updated file list information and the combined operation instruction set as upgrading instruction information.

The upgrading instruction information is finally organized by the server in form of XML to obtain a datasheet, and the datasheet is sent to the upgrading module of the client. The XML datasheet mainly includes "to-be-updated file list", "operation instruction set" and some other additional information. For example, the server may further find function description information of the latest version of the to-be-upgraded software, and add the function description information to the upgrading instruction information. The function description information is used for illustrating new functions brought to the user by the upgrading, including some description information and preview pictures, so that the user can obtain a general understanding of the upgrading before the upgrading is performed.

Content of a typical upgrading instruction table in XML format is shown by the following XML code:

```
<?xml version = "1.0" encoding="utf-8" ?>
<response>
    <features>
        <feature>
            <id>10001</id>
            <name>multiple accounts</name>
            <description> Simultaneous login function </description>
<pic_1>http://dl_test.aaa.com/aaafile/B-001.png</pic_1>
            <pic_2> http://dl_test.aaa.com/aaafile/B-002.png </pic_2>
        </feature>
    </features>
    <files>
        <file>
            <name>StringBundle.xml</name>
            <path>%INSTALL_DIR%/AuI18N/2052</path>
            <size>16099</size>
            <md5>6bb5a6660683c3b688a3f2be2fbd6fba</md5>
            <key_file>1</key_file>
        </file>
        <file>
            <name>config. xml</name>
            <path>%INSTALL_DIR%/AuI18N</path>
            <size>241</size>
            <md5>9859836db15d30310509a66bcc625bd7</md5>
            <key_file>1</key_file>
        </file>
    </files>
    <actions>
        <action>
            <cmd>delete</cmd>
            <arg>%INSTALL_DIR%/Ext/Util.dll</arg>
        </action>
        <action>
            <cmd>regsvr32</cmd>
            <arg>%INSTALL_DIR%/Bin/test.dll</arg>
        </action>
    </actions>
</response>
```

In the upgrading system provided by the present disclosure, the upgrading module set in the client mainly executes the following operations: reporting a software upgrade request carrying version information of local to-be-upgraded software to the server, downloading files and updating local corresponding files according to instructions in upgrading instruction information returned by the server, and execute corresponding local upgrading operations according to the upgrading instructions.

Figure 3:
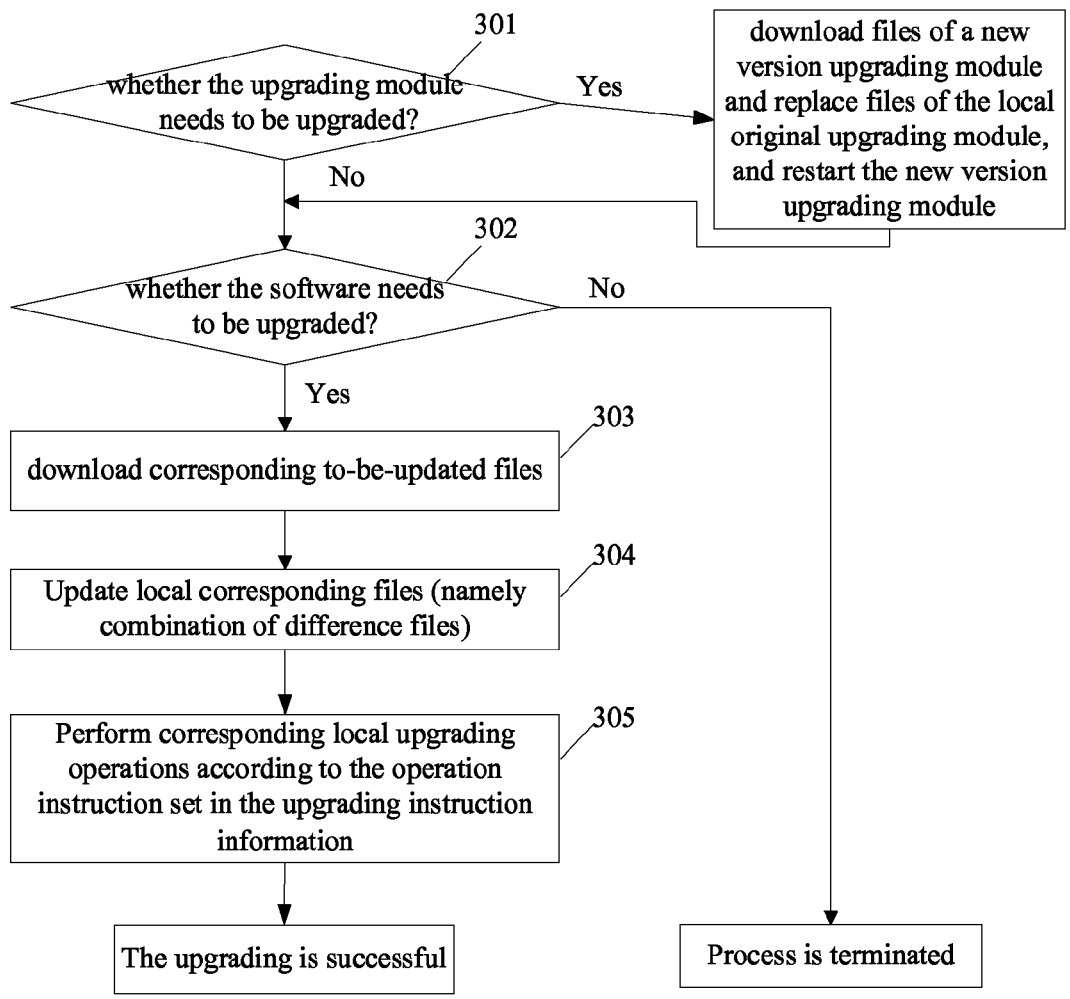
FIG. 3 is a flowchart illustrating an execution process of an upgrading module in a client according to the method provided by the present disclosure.

FIG. 3 is a flowchart illustrating an execution process of an upgrading module in a client according to the method provided by the present disclosure. With reference to FIG. 3, the process may include the following.

Block 301, the upgrading module in the client interacts with the server to determine whether the upgrading module needs to be upgraded, namely to determine whether there is an upgrading module of which the version is newer than that of the local upgrading module in the server, when there is an upgrading module of which the version is newer than that of the local upgrading module in the server, the upgrading module in the client downloads files of the new version upgrading module and replaces files of the local original upgrading module, and restarts the new version upgrading module to execute the next block 302; otherwise, directly execute the next block 302.

Since the upgrading module is very simple, and the number of files included in the upgrading module is controlled within 1 to 2, the upgrading process of the whole upgrading module is very simple and fast. Block 301 is optional of course, and the block may be skipped to execute block 302 directly.

Block 302, the upgrading module interacts with the server to determine whether the software needs to be upgraded. Namely the upgrading module reports a software upgrading request to the server, and the upgrading request carries file information of the local to-be-upgraded software. The file information includes a name and version information of each of files included in the to-be-upgraded software, and may further include information such as a HASH value and a relative path of each of the files. The server compares the to-be-upgraded software with the latest version software according to file names and version information of the files, so as to determine file difference and version difference. When there is difference, according to above-described method, the server dynamically generates upgrading instruction information according to the file difference and the version difference and issues the upgrading instruction information to the upgrading module of the client, and then block 303 is performed. When there is no software difference, the server notifies the upgrading module of the client that the upgrading is failed, and then current process is terminated.

Block 303, the upgrading instruction information comprises a to-be-updated file list, and each piece of file list information includes a file name, download path information and relative path information, so the upgrading module may download corresponding files according to the download path information of the files in the to-be-updated file list.

In addition, when the upgrading instruction information includes function description information of the new version software, after the client receives the upgrading instruction information, and before block 303, the method may further include: displaying function description information included in the upgrading instruction information, so that the user may get a general understanding of the upgrading before the upgrading is performed.

Block 304, according to the relative path information in the to-be-updated file list, the upgrading module may update the downloaded files to corresponding relative paths of installation directory of the local to-be-upgraded software. The block 304 may also be called combination of an old version and a new version of each of the difference files, namely the old version files in the installation directory of the to-be-upgraded software are replaced with the downloaded new files. The difference files include modified files and/or newly-added files.

In most cases, a to-be-replaced target file may not be modifiable or replaceable (the file may be being scanned by virus killing software, or be being used by a certain process), so it is needed to make all-wave safety mechanism assurance for these cases. Since program files of the to-be-upgraded software are usually interdependent, if one file is not replaced successfully, it is highly possible that the program cannot run any longer. In view of the, two safety assurance mechanisms are made in the present disclosure.

A) Before the combination of files (namely updating files) is performed, it is determined whether the to-be-upgraded software is running, when the to-be-upgraded software is running, the user is prompted to close the software, and corresponding files are updated after the software is closed; otherwise, corresponding files are directly upgraded. In the present disclosure, the upgrading module and the to-be-upgraded software run in two processes, and the operation of closing the to-be-upgraded software will not affect the current upgrading module.

B) Before the files are combined, local to-be-updated original files are backed up, namely to-be-replaced old version files are backed up to a temporary directory, and then the file update is performed. When it appears that a file is not updated successfully during the updating process, it is determined whether the file must be updated successfully. When the file must be updated successfully, it means that the file is indispensable for normal running of the program, and it is necessary to restore upgraded files using the backup files, to guarantee that "although the upgrading is unsuccessful, the old version can still run". When the file is not indispensable to be replaced successfully, the latest downloaded file corresponding to the file may be registered in a restart replacement service of the operating system (such as the WINDOWS system), so that the file may be updated by starting a replacement service when the system is restarted. Whether the file must be replaced successfully may be determined according to a "key file" field in the to-be-updated file list. In the case, when the server generates the to-be-updated file list, it is necessary to include a "key file" field in description information of each file to indicate whether the file is a key file, namely whether the file must be replaced successfully. For example, most underlying components are indispensable for miming a program, so these components may be taken as key files, but as to extended resource packages and plugins, they will not bring great impact to normal operation of the whole system, so they may not be taken as key files. The client checks the "key file" field of a file when the file is not updated successfully, when the file is a key file, the client determines that the file must be replaced successfully; otherwise the file is not one that must be replaced successfully.

Block 305, after the combination of files is finished, perform corresponding local upgrading operations according to the operation instruction set in the upgrading instruction information.

Each operation instruction in the operation instruction set includes: an operation instruction name which may be identified by a local client, and a relative path and a file name of a target file of the operation corresponding to the instruction. As for each operation instruction, the upgrading module may find a target file with the file name in the operation instruction from the relative path of the installation directory of the to-be-upgraded software, and perform an operation corresponding to the operation instruction name on the target file, such as registering a COM component in the file list, deleting the target file, processing the target file by adopting a program specified in the operation instruction, etc.

In a practical application, a great bandwidth may be occupied when a whole file is directly issued. It may be required for the client to download the whole file of several mega because of a little file change, which may waste a lot of time and network bandwidth, so the present disclosure also provides an embodiment that may save bandwidth and file downloading time.

In the embodiment, file information in the upgrading request sent to the server by the client further includes a HASH value of each file. After finding a modified file in the latest version software, the server may find a corresponding HASH value in the upgrading request according to a file name of the modified file, and find an original file with the same HASH value stored in the server according to the HASH value, perform a binary comparison on the original file and the latest version file with the same name as the original file, and generate a binary difference file, replace download path information of a file, which has the same name as the binary difference file and is carried in the to-be-updated file list, with download path information of the binary difference file, namely information of a to-be-updated file may include a file name, download path information of a binary difference file, relative path information and so on.

The binary difference file is usually called a diff file, the diff file is of a small size, and the diff file describes which binary-level adding, deleting or modifying operations should be performed on an old version file to generate a new version file. For instance, 2 bytes data is deleted at x, 3 bytes data is modified at y, and so on. Conventional technical solutions may be adopted to perform binary comparison on the original file and the latest version file with the same name as the original file to generate a binary difference file. In a LINUX operating system for example, a diff operation instruction may be adopted to generate a binary difference file of two files. In addition, because it will need a lot of time to generate a diff file at the server end, the generated diff file and the HASH value of the original file may both be stored, and when an upgrading request is received next time, a corresponding diff file may be found directly according to the HASH value of the file, and a download path of the diff file may be directly replaced to the to-be-updated file list without regenerating a diff file.

After downloading corresponding binary difference file according to download path information in the to-be-updated file list information, the client, according to corresponding relative path information, further combines the binary difference file and a file which has the same name as the binary difference file and is located at a relative path of the installation directory of the local to-be-upgraded software, so as to generate a whole new file. Conventional technical solutions may be adopted to combine a binary difference file, and no further descriptions will be given here.

In above embodiment, as to a file of which only content is modified, the client may only download corresponding binary difference file, since the binary difference file is of a small size, bandwidth resource and time for downloading file may be saved.

Figure 4:
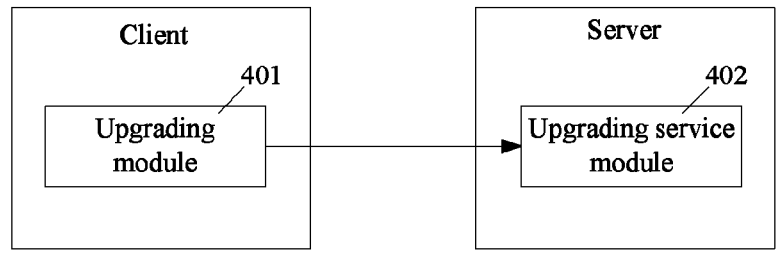
FIG. 4 is a schematic diagram illustrating a system for upgrading software according to an embodiment of the present disclosure.

Corresponding to above mentioned method, the present disclosure also discloses a system for upgrading software, which may be used to perform the method provided by the present disclosure. FIG. 4 is a diagram illustrating the system for upgrading software according to an embodiment of the present disclosure. With reference to FIG. 4, the system for upgrading software includes the following two modules.

Upgrading module 401 set in a client, used to report a software upgrading request carrying file information of local to-be-upgraded software to the server, download and update corresponding files and executing corresponding local upgrading operations according to instructions in upgrading instruction information returned by a server.

Upgrading service module 402 set in the server, used to receive the upgrading request sent by the upgrading module 401 in the client, and determine difference between the to-be-upgraded software and the latest version software according to file information of the to-be-upgraded software in the upgrading request, generate upgrading instruction information according to software difference and issues the upgrading instruction information to the upgrading module 401 in the client.

Figure 5:
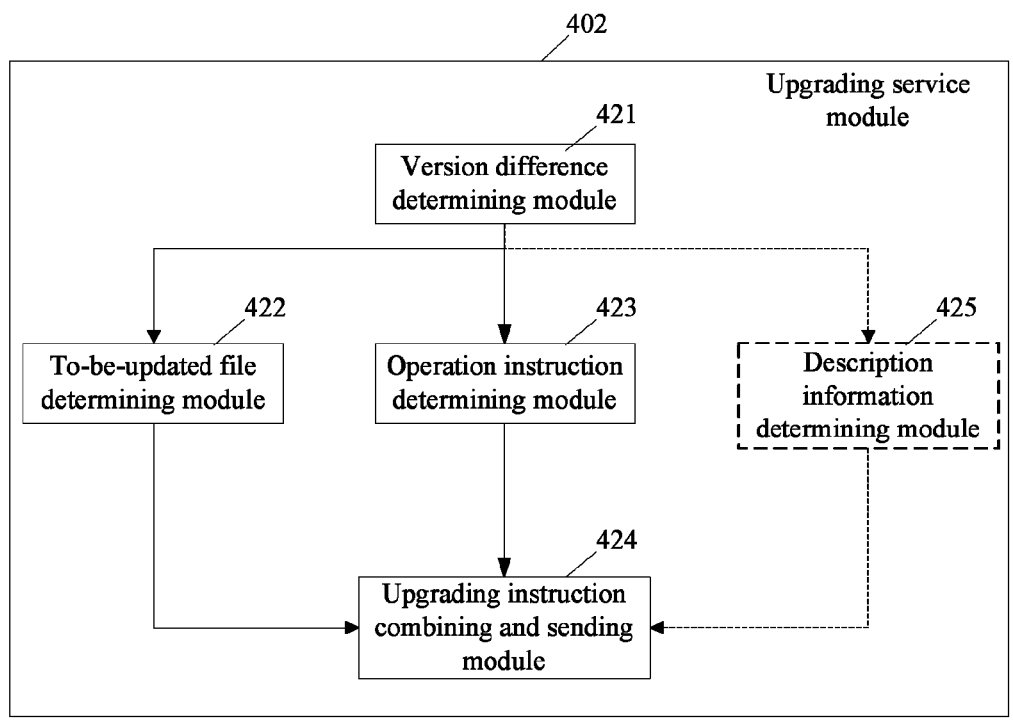
FIG. 5 is a schematic diagram illustrating an upgrading service module in a server according to an embodiment of the present disclosure.

FIG. 5 is a diagram illustrating an upgrading service module in a server according to an embodiment of the present disclosure. With reference to FIG. 5, in a specific embodiment, the upgrading service module 402 in the server end includes the following modules specifically.

Version difference determining module 421, configured to compare the to-be-upgraded software with the latest version software according to file name and version information of each file, and determine file difference and version difference.

To-be-updated file determining module 422, configured to find newly-added files and modified files in the latest version software according to the file difference, and organize list information of the newly-added files and modified files to form to-be-updated file list information. The to-be-updated file list information at least includes download path information, relative path information of each to-be-updated file, and so on.

Operation instruction determining module 423, configured to find operation instruction sets of all software each of which the version is higher than version of the to-be-upgraded software in the upgrading request, and combine the found operation instruction sets. Each operation instruction in the operation instruction set at least includes: an operation instruction name which may be identified by a local client, and a relative path and a file name of a target file of operation corresponding to the instruction.

Upgrading instruction combining and sending module 424, configured to take the to-be-updated file list information and the combined operation instruction set as upgrading instruction information and issue the upgrading instruction information to a upgrading module which initiates the upgrading request.

Further, the upgrading service module 402 may further include:

Description information determining module 425, configured to find function description information of the latest version of the to-be-upgraded software, and send the function description information to the upgrading instruction combining and sending module 424. The upgrading instruction combining and sending module 424 may further add the function description information to the upgrading instruction information and send the upgrading instruction information to the upgrading module of the client which initiates the upgrading request.

Figure 6:
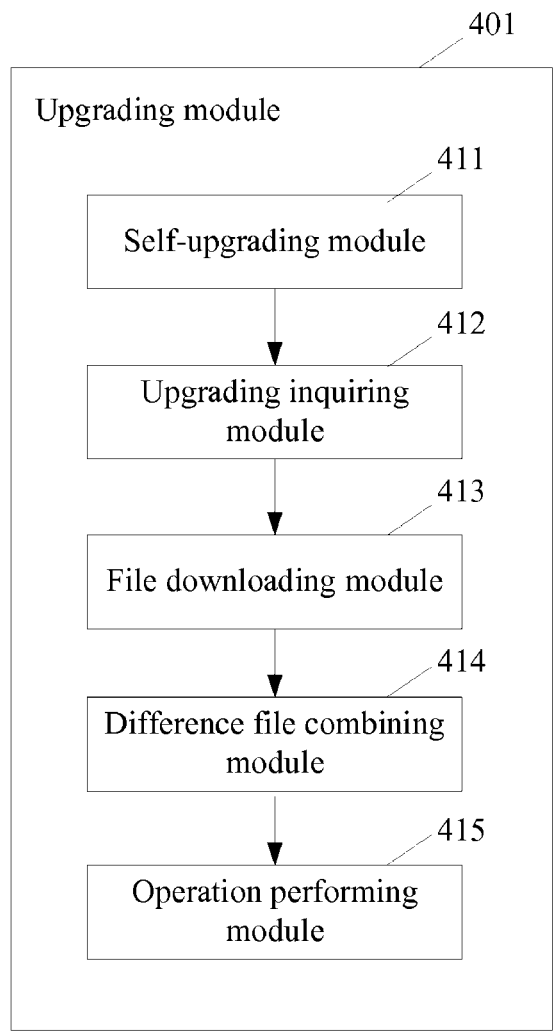
FIG. 6 is a schematic diagram illustrating an upgrading module in the client according to an embodiment of the present disclosure.

FIG. 6 is a diagram illustrating the upgrading module in the client according to an embodiment of the present disclosure. With reference to FIG. 6, in a specific embodiment, the upgrading module 401 in the client includes the following modules specifically.

Self-upgrading module 411, configured to, before a software upgrading request is reported, interact with the server to determine whether the upgrading module 401 needs to be upgraded, when the upgrading module 401 needs to be upgraded, download files of a new version upgrading module, and replace files of the original upgrading module with the files of the new version upgrading module; otherwise, the software upgrading request is reported.

Upgrading inquiring module 412, configured to report the software upgrading request carrying version information of local to-be-upgraded software to the server, and receive upgrading instruction information returned by the server.

File downloading module 413, configured to download corresponding files according to file download paths in the to-be-updated file list information in the upgrading instruction information.

Difference file combining module 414, configured to, according to the to-be-updated file list information, update the downloaded files to corresponding relative paths of the installation directory of the local to-be-upgraded software.

Operation performing module 415, configured to, as for each operation instruction in the upgrading instruction information, find a target file with the file name in the operation instruction from the relative path of the installation directory of the to-be-upgraded software, and perform the operation instruction on the target file.

In an embodiment, the difference file combining module 414 needs to further implement a safety assurance, namely the difference file combining module 414 may further include:

Close prompting module, configured to, before corresponding files are updated, determine whether the to-be-upgraded software is running, when the to-be-upgraded software is running, prompt the user to close the software, and corresponding files will be updated after the software is close, otherwise, corresponding files are directly updated.

Backup operating module, configured to, before corresponding files are updated, back up local to-be-updated original files, when a file is not updated successfully, determine whether the file must be updated successfully, when the file must be updated successfully, use the backup files to restore all upgraded files; otherwise, register the latest download file corresponding to the file in a restart replacement service of the operating system, and start the replacement service to update the file when the system is restarted.

In order to further save bandwidth resource and time for downloading files, in another embodiment, the to-be-updated file determining module 422 may further include a binary difference file generating module, which is configured to, after the to-be-updated file determining module 422 finds a modified file in the latest version software, find a corresponding HASH value in the upgrading request according to a file name of the modified file, and find an original file which is stored at the server end and has the same HASH value according to the HASH value, perform a binary comparison on the original file and the latest version file which has the same file name as the original file, generate a binary difference file, and replace download path information of a file, with the same name as the binary difference file, in the to-be-updated file list with download path information of the binary difference file.

Correspondingly, the difference file combining module 414 in the client may further include a binary difference combining module, which is configured to, after downloading the binary difference file, combine the binary difference file and a file which has the same name as the binary difference file and is located at the relative path of the installation directory of the local to-be-upgraded software.

The present disclosure also provides a storage medium, which is used for storing instructions which instructs a machine to execute the method for upgrading software as described above. Specifically, a system or device configured with the storage medium may be provided, and the storage medium stores software program code for implementing function of any embodiment described above, and a computer (or CPU or MPU) of the system or device should be able to read and execute the program code stored in the storage medium.

In such case, the program code read from the storage medium can implement function of the any embodiment of the above-mentioned embodiments, so the program code and storage medium storing the program code make a part of the present disclosure.

Embodiments of storage medium for providing program codes include floppy disk, hard disk, magnet optic disk, compact disk (like CD-ROM, CD-R, CD-RW, DVD-ROM, DVD-RAM, DVD-RW, DVD+RW), magnetic tape, nonvolatile memory card and ROM. Optionally, program code can be downloaded from the server computer through communication network.

In addition, it should be understood that, part of or all of the practical operations may be achieved not only by executing the program code read by the computer, but also by an operating system in the computer instructed by instructions based on the program code, so as to implement function of any embodiment among the above-mentioned embodiments.

In addition, it can be understood that, by writing the program code read from a storage medium to a memory set in an extended board in the computer or to a memory set in an extended unit connected to the computer, instructions based on the program code may instruct a CPU installed in the extended board or the extended unit to execute part of or all of practical operations, so as to implement function of any embodiment of the above-mentioned embodiments.

The foregoing description is only preferred embodiments of the present disclosure and is not used for limiting the protection scope thereof. Any modification, equivalent substitution, or improvement made without departing from the spirit and principle of the present disclosure should be covered by the protection scope of the present disclosure.

The invention claimed is:

1. A method for upgrading software, comprising:
reporting, by a client, a upgrading request of software to a server, and the upgrading request carrying file information of to-be-upgraded software in local;
determining, by the server, difference between the to-be-upgraded software and a latest version software according to the file information of the to-be-upgraded software in the upgrading request, and generating, by the server, upgrading instruction information according to the difference and sending the upgrading instruction information to the client;
downloading and updating, by the client, corresponding files and executing, by the client, a corresponding local upgrading operation according to an instruction in the upgrading instruction information;
wherein, the file information of the to-be-upgraded software carried in the upgrading request comprises: file name and version information of each of files of the to-be-upgraded software;
determining, by the server, difference between the to-be-upgraded software and the latest version software according to the file information of the to-be-upgraded software in the upgrading request comprises: comparing, by the server, the to-be-upgraded software with the latest version software according to file name and version information of each of files of the to-be-upgraded software, and determining, by the server, file difference and version difference;
generating, by the server, upgrading instruction information according to the difference comprises:
finding, by the server, a newly-added file and a modified file in the latest version software according to the file difference, and organizing, by the server, list information of the newly-added file and modified file into a to-be-updated file list;
finding, by the server, operation instruction sets of all software each of which the version is higher than the version of the to-be-upgraded software in the upgrading request according to the version difference, and combining, by the server, found operation instruction sets;
taking, by the server, the to-be-updated file list and combined operation instruction set as the upgrading instruction information.

2. The method according to claim 1, wherein,
generating, by the server, upgrading instruction information further comprises: finding, by the server, function description information of the latest version software, and adding, by the server, the function description information to the upgrading instruction information;

after receiving, by the client, the upgrading instruction information and before downloading and updating, by the client, a corresponding file and executing a corresponding local upgrading operation, further comprising: displaying, by the client, the function description information comprised in the upgrading instruction information.

3. The method according to claim 1, wherein, the to-be-updated file list comprises: a download path and a relative path of each to-be-updated file;
downloading and updating, by the client, a corresponding file according to an instruction in the upgrading instruction information comprises: downloading, by the client, the corresponding file according to the download path in the to-be-updated file list, and updating downloaded file to the relative path of an installation directory of the to-be-upgraded software.

4. The method according to claim 3, wherein, file information in the upgrading request further comprises a HASH value of each file;
after finding, by the server, a modified file in the latest version software, further comprising: finding, by the server, a HASH value in the upgrading request according to a file name of the modified file, and finding, by the server, an original file which has the same HASH value and is stored in the server, and performing, by the server, a binary comparison on the original file and a latest version file with the same name as the original file, generating a binary difference file, replacing a download path of the file which has the same name as the binary difference file and is carried in the to-be-updated file list with a download path of the binary difference file;
downloading, by the client, a corresponding binary difference file according to the download path in the to-be-updated file list, and combining the binary difference file with a file which has the same name as the binary difference file and is located in the relative path of the installation directory of the to-be-upgraded software.

5. The method according to claim 1, wherein, each operation instruction in the operation instruction set comprises: an operation instruction name identifiable for the client, a relative path and a file name of a target file corresponding to an operation of the operation instruction;
executing, by the client, a corresponding local upgrading operation according to an instruction in the upgrading instruction information comprises: finding a target file with the file name in an operation instruction from the relative path of the installation directory of the local to-be-upgraded software, and performing the operation instruction on the target file.

6. The method according to claim 1, wherein, operations on the client side in the method being executed by an upgrading module corresponding to the local to-be-upgraded software, and the method further comprises: after the upgrading module is started and before reporting the upgrading request, interacting, by the upgrading module, with the server first to determine whether the upgrading module needs to be upgraded, and downloading, by the upgrading module, files of a new version upgrading module when the upgrading module needs to be upgraded, and replacing files of original upgrading module with the files of the new version upgrading module.

7. The method according to claim 1, wherein,
after downloading, by the client, the corresponding file according to the instruction in the upgrading instruction information, and before updating the corresponding file, further comprising: backing up local to-be-updated original files before updating the files;

when a file is not updated successfully, determining whether the file must be updated successfully, when the file must be updated successfully, using backup files to restore upgraded files; otherwise, registering the latest download file corresponding to the file in a restart replacement service of an operating system, and starting the restart replacement service to update the file when the operating system is restarted.

8. A system having executable instructions stored in a memory for upgrading software, comprising:

an upgrading module set in a client, configured to report a software upgrading request carrying file information of a to-be-upgraded software to the server, download and update a corresponding file and executing a corresponding local upgrading operation according to an instruction in upgrading instruction information returned by a server; and an upgrading service module set in the server, configured to receive the upgrading request sent by the upgrading module in the client, and determine difference between the to-be-upgraded software and a latest version software according to file information of the to-be-upgraded software in the upgrading request, generate upgrading instruction information according to the difference and issues the upgrading instruction information to the upgrading module in the client;

wherein, the upgrading service module comprises:

a version difference determining module, configured to compare the to-be-upgraded software with the latest version software according to file name and version information of each file comprised in the to-be-upgraded software, and determine file difference and version difference;

a to-be-updated file determining module, configured to find a newly-added file and a modified file in the latest version software according to the file difference, and organize list information of the newly-added file and modified file to form a to-be-updated file list;

an operation instruction determining module, configured to find operation instruction sets of all software each of which the version is higher than version of the to-be-upgraded software in the upgrading request, and combine found operation instruction sets; and an upgrading instruction combining and sending module, configured to take the to-be-updated file list and combined operation instruction set as upgrading instruction information and send the upgrading instruction information to the upgrading module of the client.

9. The system according to claim 8, wherein, the upgrading service module further comprises:

a description information determining module, configured to find function description information of the latest version software, and send the function description information to the upgrading instruction combining and sending module;

the upgrading instruction combining and sending module further adds the function description information to the upgrading instruction information and send the upgrading instruction information to the upgrading module of the client.

10. The system according to claim 8, wherein, the to-be-updated file list comprises: a download path and a relative path of each to-be-updated file;

each operation instruction in the operation instruction set comprises: an operation instruction name identifiable for local client, a relative path and a file name of a target file corresponding to an operation of the operation instruction;

the upgrading module in the client comprises:

a file downloading module, configured to download a corresponding file according to a download path in the to-be-updated file list in the upgrading instruction information;

a difference file combining module, configured to, according to the to-be-updated file list, update the downloaded file to the relative path of the installation directory of the local to-be-upgraded software;

an operation performing module, configured to find a target file with the file name in an operation instruction from the relative path of the installation directory of the to-be-upgraded software, and perform the operation instruction on the target file.

11. The system according to claim 10, wherein, the to-be-updated file determining module comprises a binary difference file generating module, configured to, after the to-be-updated file determining module finds a modified file in the latest version software, find a corresponding HASH value in the upgrading request according to a file name of the modified file, and find an original file which is stored at the server and has the same HASH value according to the HASH value, perform a binary comparison on the original file and a latest version file which has the same file name as the original file, generate a binary difference file, and replace a download path of a file, which has the same name as the binary difference file and is carried in the to-be-updated file list with a download path of the binary difference file;

the difference file combining module in the client further comprises a binary difference combining module, configured to, after downloading the binary difference file, combine the binary difference file and a file which has the same name as the binary difference file and is located at the relative path of the installation directory of the local to-be-upgraded software.

12. The system according to claim 10, wherein, the difference file combining module further comprises a backup operating module, configured to, before the corresponding file is updated, back up local to-be-updated original files, when a file is not updated successfully, determine whether the file must be updated successfully, when the file must be updated successfully, use the backup files to restore all upgraded files; otherwise, register the latest download file corresponding to the file in a restart replacement service of an operating system, and start the restart replacement service to update the file when the operating system is restarted.

13. The system according to claim 8, wherein, the upgrading module in the client comprises a self-upgrading module, configured to, before a upgrading request is reported, interact with the server to determine whether the upgrading module needs to be upgraded, when the upgrading module needs to be upgraded, download files of a new version upgrading module, and replace files of the original upgrading module with the files of the new version upgrading module; otherwise, the upgrading request is reported.

* * * * *